Patented Apr. 4, 1944

2,345,717

UNITED STATES PATENT OFFICE 2,345,717

TREATMENT OF POLYMER SUBSTANCES

Luther B. Turner, Roselle Park, N. J., assignor, by mesne assignments, to Jasco, Incorporated, a corporation of Louisiana No Drawing. Application December 19, 1940, Serial No. 370,795

1 Claim. (Cl. 260—23)

This invention relates to synthetic polymer materials prepared by the polymerization of olefin substances such as isobutylene, and relates particularly to the "compounding" of the high molecular weight rubbery polymers of the iso-olefines with other substances. More particularly, it relates to the methods and apparatus for the treatment of the polymer after the polymerization step, with a minimum of depolymerization of the completed polymer.

This application is a continuation in part of my application Serial No. 237,204, filed October 27, 1938.

It has been found possible to polymerize the gaseous iso-olefine substances of the type of isobutylene into high molecular weight polymers to produce synthetic materials of highly viscous or rubbery character. These materials may have molecular weights ranging from less than 1,000 to 350,000 or more, and their physical properties vary from those of a highly viscous oil to those of a rubbery solid, according to the molecular weight.

These materials are useful for many purposes, both in the form as prepared, in the purified form, and in combination with many other substances such as oils, fillers, pigments, gums, resins, etc., and this is particularly the case with the high molecular weight rubbery forms of the polymer.

The isobutylene polymer material as prepared, especially when the average molecular weight is of the order of 50,000 to 350,000, is a substance having some physical properties much like those of rubber, that is, the polymer material is highly elastic like rubber, with similar properties of return to shape after deformation, and similar high strength in tension and compression. Isobutylene polymer substance is very greatly different from rubber in other respects; for example, the polymer substance is chemically nearly fully saturated, in contrast to the high degree of unsaturation of rubber; the polymer substance is highly resistant to oxidation, in contrast to rubber, which oxidizes readily; the polymer substance does not vulcanize with sulphur as does rubber, and sulphur can be combined chemically with the polymer substance only with great difficulty and under very special conditions.

Like rubber, the isobutylene polymer is subject to a substantial molecular weight breakdown when worked up on rolls and similar familiar rubber compounding equipment, and the polymer is much more sensitive to heat decomposition than is rubber. This characteristic has not caused any serious difficulty with rubber because the large majority of rubber products are finally vulcanized, which process appears to involve a polymerization reaction, but the isobutylene polymers must be used without vulcanization and any breakdown or loss of molecular weight which once occurs cannot be regained.

For these reasons, the working up, compounding and processing of polybutylene products of high molecular weight cannot use the familiar rubber technique, except in the relatively few cases where breakdown is of no significance, and it is a problem of the first importance to develop a technique for handling the new polymers with a minimum loss of molecular weight.

Working up or compounding the polymer consists in rapidly exposing fresh surfaces of the mass to the treating agent or compounding material, but this cannot be done successfully by any process in which the subjection of the material to pressure, for example, by rolls or squeezing mechanism, occurs. It has been found, however, that compounding or working can be accomplished very readily by means of various mixing machines which operate on what may be described as a tension principle, that is to say, which effect the continual exposure of new surfaces by a process of stretching the mass of polymer repeatedly. Such working is practiced in certain remote arts, for example, in bread making, but is not used in working or compounding rubber or other similar materials.

Rubber can thus be worked on rolls for the incorporation of pigments and other compounding substances with little or no injury to the rubber; whereas the polymer substance is very sensitive to working upon the rolls, and even a few minutes of pressure working upon the roll mill produces a great breakdown in molecular weight of the polymer so as to destroy the usefulness of the material for some purposes, and accordingly it has been found impossible to handle the material in the manner in which rubber is handled, and at the same time preserve it against this type of deterioration.

The present invention depends upon the discovery that the Werner and Pfleiderer type of kneading machine, by which is meant a machine which "works" the substance by a pulling action and a traction effect, in a manner analogous to the pulling of taffy (which machine is useless for milling rubber, because of the very great surface exposed to air, and the resulting serious oxidation, and the great difficulty of making the rubber respond to the movements of the knives) is highly efficient and satisfactory for use with the polymer material. This high efficiency and usefulness appear to depend upon the newly discovered fact that whereas pressure destroys the molecules of the polymer very rapidly, tractive or pulling treatment has little or no effect in breaking down the polymer molecules.

Furthermore, the polymer substance is much more sensitive to heat, than is rubber, and an amount of heat which is not only harmless to rubber but also is necessary to soften it, is seriously harmful to the isobutylene polymer material. The usual rubber mills such as the roll type, or the Banbury mixer type, develop large amounts of heat in the body of the rubber, in consequence of the severe mechanical pressure and internal friction, whereas the Werner and Pfleiderer type of kneader, by producing traction only upon the polymer, causes the development of only a small amount of internal heat, an amount sufficiently small to be substantially harmless to the polymer material.

To describe the type of action referred to above, applicant uses the word "kneading" and limits it to the process of continually pulling and stretching the material, as distinguished from the term "milling" in which the compounding or working is accomplished by compression.

There appear to be no necessity of describing in detail the type of mechanism used for the present process, it being understood that automatic taffy pulling equipment in which two or more sets of arms are employed continually stretching out the mass of polymer alternately and allowing it to be folded on itself between the stretching operations, or even better, mechanism of the same general type used in bread kneading, which is employed to prevent squeezing out of the gas, and not to a process analogous to the present operation. Bread kneading machinery generally consists of a mixing chamber with pairs of rotating arms generally set at right angles to each other, with the result that the arms never approach each other so closely as to exert any substantial pressure, but produce a separating and stretching effect on the material which adheres to the arms. A typical machine of this type is the Werner-Pfleiderer kneader which is very satisfactory for the present purposes.

The butylene polymer is sufficiently tacky (the heavy high molecular weight product should be heated mildly) to adhere to the kneading arms and is thus repeatedly stretched, folded and restretched rapidly exposing new surface to the action of the treating agent or compounding material. In this manner, the mixing or compounding may be accomplished in a few hours without substantial breakdown. There is ordinarily some loss of molecular weight, but milling for the same time at same temperature will inevitably produce a much greater deterioration.

Thus, an object of the invention is to compound an olefine with other substances with minimum reduction of average molecular weight.

In practicing the present invention, the polymer may be prepared by a polymerization procedure which consists in treating the gaseous olefines such as isobutylene with a catalyst, such as boron trifluoride, $BF_3$, or aluminum chloride, $AlCl_3$, at low temperatures, ranging from $-10°$ C. down to $-100°$ C., preferably in the presence of a suitable solvent such as a liquefied normally gaseous solvent, say ethylene or ethane or propane or carbon tetrachloride or carbon disulfide.

In this procedure, it is found that the molecular weight, and with it the character, and degree of solidity of the material, depend upon the temperature at which the polymerization occurs, the lower the temperature, the higher the molecular weight and the more rubbery the polymer, and on the purity of the iso-olefin polymerized.

The polymer as so prepared should first be freed from the solvent and this may be accomplished during a kneading operation, the temperature is gradually allowed to rise to room temperature and the gas-free product washed with water or soda to remove traces of catalyst. Both of these operations may be conducted during the kneading step.

*Example 1*

A batch of the polymer, which may conveniently be an amount of 200 pounds, was placed in the Werner-Pfleiderer kneader and the kneading operation begun for the incorporation of sufficient oil to produce a compound containing 20% of the polymer in the oil. However, the oil was not added in total quantity at the beginning of the kneading operation, but the addition of the oil was started in practically a drop-wise manner, approximately 1 to 3 gallons of oil being added during the first hour of kneading. If the oil is added at a rate faster than this, the surface of the polymer becomes coated with a continuous film of oil, and the oil is no longer mixed in satisfactorily. Instead, the final product will have in it particles of the original polymer containing no oil. After about 3 to 10 hours, a sufficient amount of oil, that is, approximately 10 gallons, had been added to the 200 pounds of polyisobutylene; and a sufficient softening and permeation of the polyisobutylene by the oil was obtained so that the rate of the addition of the oil was speeded up considerably. By the time the 10 gallons of oil had been added, a considerable change in the polymer occurred and it assumed a taffy-like consistency and the further amounts of oil were worked in much more rapidly, the remaining quantity of the oil being conveniently added over the remainder of a time interval of approximately 18 hours, more or less.

Starting with a polymer having an average molecular weight of 150,000, the molecular weight is broken down by the kneading operation no further than to about 110,000, even though the kneading operation is prolonged. In contrast, a similar compounding for a much shorter time for the incorporation of a much smaller amount of oil upon the ordinary rubber roll mills caused a breakdown of molecular weight from 150,000 to 64,000, which for many purposes is prohibitively low.

A similar procedure may be utilized for the incorporation into the polymer of pigment and filler substances. Such substances as talc, powdered slate, lime, chalk, asbestos, wood flour, paper fibers, and in fact, substantially any of the filler substances may readily be incorporated into the polymer by a similar procedure, and practically any of the inert pigment substances and lakes likewise are readily incorporated into the polymer and compounded therewith.

In the above example, the kneader may be operated at normal room temperature, below room temperature, or above room temperature up to temperatures of about 150–175° C. However, for most purposes, where oil is to be incorporated into the polymer, it is preferable to operate at or near room temperature. It is found that operating at room temperature, there is less breakdown of molecular weight values of the polymer than occurs when operations are conducted at higher temperatures. Conversely, at sub-normal temperatures, there is still less molecular weight breakdown, from temperature, but the incorporation of the oily material is very much slower, and the greatly prolonged kneading required results in somewhat more breakdown at sub-normal temperatures, for the incorporation of a given amount of oil into the polymer, than occurs at room temperature. Similarly, the incorporation of oil is so much more rapid at elevated temperature that the very substantial shortening of the kneading operation at elevated temperatures results in much less breakdown in molecular weight than would occur if the incorporation required the same length of time as at room temperature. Thus, relatively little difference in product is obtained whether the operation is conducted at sub-normal temperatures, normal temperatures, or elevated temperatures, although at elevated temperatures above about 125° C. the temperature breakdown increases with rising temperature more rapidly than does the speed of incorporation of the oil into the polymer; hence, a composition prepared at such elevated temperatures tends to be of somewhat lower molecular weight than one prepared at normal temperatures or sub-normal temperatures.

In some instances, however, a substantially elevated temperature is essential to satisfactory mixing, as is the case when paraffin wax is to be incorporated into the polymer.

Example 2

The Werner and Pfleiderer type kneader was heated to a temperature of approximately 93° C. by the use of steam in a steam jacket. Approximately 200 pounds of the polymer were placed in the kneader and the kneading operation begun. Approximately 800 pounds of paraffin wax of any desired grade, such as wax melting as low as 125° F. to wax melting as high as 145° F., were melted at a convenient temperature, and the melted wax added to the polymer in the kneading operation in the same manner as disclosed in Example 1, the paraffin being added in practically a dropwise manner, although at a substantially more rapid rate than in Example 1, 7 to 25 pounds of melted paraffin wax being added in the course of 20 to 40 minutes. At the end of this period, the rate of addition of the melted paraffin wax was increased, so that approximately 75 pounds were added in a total time of from 1 to 2 hours. The addition of such an amount of the melted paraffin is sufficient to effect a very substantial softening of the polymer, and permit a much more rapid addition of the melted wax. The remainder of the 800 pounds of wax was then added at a relatively rapid rate of speed, the overall operation requiring only from 4 to 6 hours for the entire mixing procedure.

As in the case of Example 1, polymeric material having a molecular weight of 150,000 to 175,000 may be mixed with the paraffin wax in large proportions during which operation the breakdown in molecular weight of the polymer may be limited to such an amount that at the close of the compounding operation, the polymer still has a molecular weight ranging from 110,000 to 135,000.

This material when cooled to room temperature is particularly valuable for a wide range of coating uses, waterproofing and similar uses. As in Example 1, the material may be used as originally compounded, or it may be used in combination with a wide range of pigment and filler substances as hereinabove listed.

Example 3

A batch of the polymer having an average molecular weight of 100,000 to 150,000 may be placed in the kneader, together with a desired amount of filler or pigment, which may be from 10 pounds of filler or pigment to 100 pounds of polymer, or lesser amounts of polymer and larger amounts of filler and pigment may be used, until a proportion such as 5 pounds of polymer to 95 pounds of pigment or filler may be used. Over the entire range, the polymer and pigment may be put into the kneader together, the kneading operation started, and continued for a length of time of from 2 to 6 hours. If the proportion of polymer is in excess of the proportion of pigment, the operation may conveniently be conducted at room temperature. If, however, the proportion of filler or pigment is greater than the proportion of polymer, the incorporation into the polymer is facilitated by applying heat to the jacket of the kneading machine. It will be noted that the amount of kneading required for the incorporation into the polymer of the solid materials is considerably less, than is required for the incorporation of oily materials, and accordingly the breakdown which occurs is considerably less than that which occurs in the incorporation of the oils.

This is in contrast to the situation which obtains either with the rubber mill rolls or the Banbury mixer where a longer time, and more severe working is required for the incorporation of pigment, than is required for the incorporation of oily liquids. Accordingly, an attempt to incorporate the solid pigments and fillers on the rubber rolls or in the Banbury mixer results in much greater and more serious depolymerization and reduction of the molecular weight of the polymer.

The polymer in some instances contains undesired impurities, such as acid bodies, traces of the boron trifluoride catalyst, traces of solvent from the polymerization step, and traces of low molecular weight material. These undesired components are readily removed by a similar kneading procedure in the presence of substantial quantities of water. The type of washing procedure varies according to the molecular weight of the polymer. If the average molecular weight is below 50,000, the washing operation is relatively simple, since the polymer is less rubbery, and to some extent approaches a plastic substance.

Example 4

A batch of the polymer material, say 100 pounds, having a molecular weight of 25,000 to 50,000, may be placed in the kneader, and covered with water. A kneading in water for a period of from 1 to 6 hours is sufficient to remove substantially all impurities. It may be noted that with such low molecular weight polymer, there seems to be a small quantity of some substance present in the polymer which serves as an emulsifying agent and an emulsion of the polymer in water is produced rather quickly. The dispersion of the substances into the emulsion form produces a very large surface interface, through which the water-soluble impurities diffuse very rapidly. The emulsion may then be broken by heating the kneader, and the water may then be poured off from the polymer leaving it in pure form free from the various above-mentioned impurities. An amount of water as small as 10% of the amount of the polymer may under these conditions be sufficient for a washing operation, but for complete removal of impurities, larger amounts are sometimes desirable. It may be observed that in this operation, practically no breakdown of the polymer occurs.

In the case of polymer having a molecular weight in excess of 50,000, the rubbery character of the polymer makes a washing operation somewhat less easy.

Example 5

Accordingly, the batch of polymer having a molecular weight of 55,000 to 350,000 may be placed in the kneader, with approximately 10% of its weight of water and the kneading started. At the beginning of the kneading operation, the solid polymer is merely pushed about by the kneading members, but after a time as the kneading proceeds, the polymer takes on a taffy-like character, and is pulled, stretched and kneaded between the blades of the kneading machine. This kneading may be continued for a period of approximately an hour, at the end of which time most of the water will be distributed through the mass of the polymer. Additional water may then be added, in an amount ranging from 10% to 100% of the amount of polymer, and the kneading continued for another hour, after which the excess water may be poured off and replaced with fresh water and the kneading continued for another hour. The procedure of kneading the polymer in fresh charges of wash water is desirably repeated about six times, at the end of which operation the polymer is substantially free from impurities. As in Example 4, the material in the kneader may be heated to break the emulsion, the water drawn off and the material further heated until it is fully dried and free from impurities.

It is to be noted that usually the water forms an emulsion within the polymer with water droplets, as the disperse phase, within the mass of the polymer as the continuous phase, the whole being submerged in a body of water in the kneader.

A suitable number of changes of water, with adequate kneading in each change, will cause the polymer to become neutral to litmus paper, to Congo red paper or to methyl orange solution, and the material becomes tasteless and odorless.

The washing and kneading operations are desirably conducted at ordinary room temperature, or between 40° and 90° F., since it is found that below about 40° F., the emulsion is broken and washing does not occur, and above 90° the emulsion also is broken and the washing does not occur.

At the completion of the washing operation, the residual water present in the polymer may be removed by heating the polymer above about 90° F., whereupon the emulsion is broken, the water is readily removed, and the polymer returned to its original solid state.

In other instances it is found desirable to incorporate into the isobutylene polymer substance various amounts of gummy materials, or other resins both synthetic and natural, or natural rubber.

Example 6

For this purpose the desired amount of the polymer substance may be placed in the kneader and the kneading begun, either at room temperature, or at somewhat elevated temperatures as desired. Part or all of the gums, resins or rubber may then be added to the kneader and the kneading continued. Usually it is preferable to knead the polymer alone for a short period of time until the taffy-like state begins to be assumed. The addition of the gummy, resinous or rubbery materials may then occur, in some instances the whole amount of gums, resins or rubbery material may be added directly, especially if the amount is relatively small. Alternatively, the added substances may be put into the kneader in relatively small portions, with intervals between additions sufficient to permit of the incorporation of a substantial amount of the first portion before the second portion is added, and the kneading may be continued until a substantially homogeneous mass is obtained.

Thus the procedure of this invention provides a simple and convenient step for the processing of the high molecular weight rubbery polymer which results in a thorough incorporation of material into the polymer with a minimum of breakdown of molecular weight.

While there are above disclosed but a limited number of embodiments of inventive concept, it is possible to provide still other embodiments without departure from the inventive concept hereinabove disclosed, and it is therefore desired that only such limtiations be imposed upon the appended claims as are stated therein or required by the prior art.

I claim:

In the preparation of a composition of matter comprising a polyisobutylene having a molecular weight between 50,000 and 350,000 with a paraffin wax, the step of kneading the paraffin into the polymer at a temperature between the melting point of the paraffin and 175° C., in successive small portions, avoiding the formation of slippery surface layers by beginning the addition of the molten paraffin in practically a dropwise manner, continuing the kneading until the successive portions are homogeneously incorporated into the polymer, 7 to 25 parts of melted paraffin per 200 parts of polymer being added in the first 20 to 40 minutes.

LUTHER B. TURNER.